(12) United States Patent
Kawahara et al.

(10) Patent No.: US 7,170,510 B2
(45) Date of Patent: Jan. 30, 2007

(54) METHOD AND APPARATUS FOR INDICATING A USAGE CONTEXT OF A COMPUTATIONAL RESOURCE THROUGH VISUAL EFFECTS

(75) Inventors: Hideya Kawahara, Mountain View, CA (US); Chester D. Rose, Mt. View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 514 days.

(21) Appl. No.: 10/713,847

(22) Filed: Nov. 14, 2003

(65) Prior Publication Data

US 2005/0104880 A1 May 19, 2005

(51) Int. Cl.
*G06T 15/00* (2006.01)

(52) U.S. Cl. .............. 345/419; 345/427; 715/782; 715/805

(58) Field of Classification Search .......... 345/419, 345/420, 427; 715/782, 788, 805, 850
See application file for complete search history.

(56) References Cited

U.S. PATENT DOCUMENTS

| | | | |
|---|---|---|---|
| 5,601,432 A | 2/1997 | Bergman | 434/118 |
| 5,689,286 A | 11/1997 | Wugofski | 345/348 |
| 5,831,617 A | 11/1998 | Bhukhanwala | 345/349 |
| 5,880,733 A | 3/1999 | Horvitz et al. | 345/355 |
| 6,229,542 B1 | 5/2001 | Miller | 345/358 |
| 6,414,679 B1 * | 7/2002 | Miodonski et al. | 345/420 |
| 6,597,358 B2 * | 7/2003 | Miller | 345/427 |
| 6,636,246 B1 * | 10/2003 | Gallo et al. | 715/805 |
| 6,765,567 B1 * | 7/2004 | Roberson et al. | 345/419 |
| 6,822,662 B1 * | 11/2004 | Cook et al. | 715/788 |
| 6,909,443 B1 * | 6/2005 | Robertson et al. | 715/782 |
| 7,013,435 B2 * | 3/2006 | Gallo et al. | 715/850 |
| 2001/0040571 A1 | 11/2001 | Miller | 345/419 |
| 2002/0113820 A1 | 8/2002 | Robinson et al. | 345/764 |
| 2004/0090467 A1 | 5/2004 | Bonura et al. | 345/790 |

FOREIGN PATENT DOCUMENTS

| | | |
|---|---|---|
| WO | WO 00/60442 | 10/2000 |
| WO | 02/33568 | 4/2002 |
| WO | WO 02/029760 | 4/2002 |
| WO | 04/044727 | 5/2004 |

* cited by examiner

*Primary Examiner*—Phu K. Nguyen
(74) *Attorney, Agent, or Firm*—Park, Vaughan & Fleming LLP

(57) ABSTRACT

One embodiment of the present invention provides a system that facilitates using visual effects within a three-dimensional (3D) display environment to indicate a usage context of a computational resource, which is represented by a 3D object in the 3D display environment. During operation, the system determines the usage context of the computational resource. Next, the system determines visual effects corresponding to the usage context to apply to the 3D object which represents the computational resource. Finally, the system applies the visual effects to the 3D object. In this way, the usage context of the corresponding computational resource can be determined by viewing the 3D object within the 3D display environment.

36 Claims, 5 Drawing Sheets

METHOD AND APPARATUS FOR INDICATING A USAGE CONTEXT OF A COMPUTATIONAL RESOURCE THROUGH VISUAL EFFECTS

RELATED APPLICATION

The subject matter of this application is related to the subject matter in a co-pending non-provisional application entitled, "Method and Apparatus for Manipulating Two-Dimensional Windows Within a Three-Dimensional Display Model," by inventor Hideya Kawahara having Ser. No. 10/663,609, and filing date 15 Sep. 2003.

BACKGROUND

1. Field of the Invention

The present invention relates to user interfaces for computer systems. More specifically, the present invention relates to a method and an apparatus for using visual effects to convey a usage context of a computational resource.

2. Related Art

Today, most personal computers and other high-end devices support window-based graphical user interfaces (GUIs), which were originally developed back in the 1980's. These window-based interfaces allow a user to manipulate windows through a pointing device (such as a mouse), in much the same way that pages can be manipulated on a desktop. However, because of limitations on graphical processing power at the time windows were being developed, many of the design decisions for windows were made with computational efficiency in mind. In particular, window-based systems provide a very flat (two-dimensional) 2D user experience, and windows are typically manipulated using operations that keep modifications of display pixels to a minimum. Even today's desktop environments like Microsoft Windows (distributed by the Microsoft Corporation of Redmond, Wash.) include vestiges of design decisions made back then.

In recent years, because of increasing computational requirements of 3D applications, especially 3D games, the graphical processing power of personal computers and other high-end devices has increased dramatically. For example, a middle range PC graphics card, the "GeForce2 GTS" distributed by the NVIDIA Corporation of Sunnyvale, Calif., provides a 3D rendering speed of 25 million polygon-per-second, and Microsoft's "Xbox" game console provides 125 million polygon-per-second. These numbers are significantly better than those of high-end graphics workstation in the early 1990's, which cost tens of thousands (and even hundreds of thousands) of dollars.

As graphical processing power has increased in recent years, a number of 3D user interfaces have been developed. These 3D interfaces typically allow a user to navigate through and manipulate 3D objects. However, these 3D interfaces are mainly focused on exploiting 3D capabilities, while little attention has been given to supporting existing, legacy window-based 2D applications within these 3D user interfaces.

Hence, what needed is a method and an apparatus for leveraging the capabilities of 3D interfaces to convey more information about 2D applications running in a 3D workspace.

SUMMARY

One embodiment of the present invention provides a system that facilitates using visual effects within a three-dimensional (3D) display environment to indicate a usage context of a computational resource, which is represented by a 3D object in the 3D display environment. During operation, the system determines the usage context of the computational resource. Next, the system determines visual effects corresponding to the usage context to apply to the 3D object which represents the computational resource. Finally, the system applies the visual effects to the 3D object. In this way, the usage context of the corresponding computational resource can be determined by viewing the 3D object within the 3D display environment.

In a variation on this embodiment, the computational resource can include one of a file, a folder, and an application.

In a variation on this embodiment, the usage context of the computational resource can specify a time at which the computational resource was created, a last time the computational resource was accessed, a frequency of usage of the computational resource, an owner of the computational resource, a location of the computational resource within the 3D display environment, and a group membership of the computational resource.

In a variation on this embodiment, the visual effects can include a location of the 3D object, an orientation of the 3D object, a color of the 3D object, a texture of the 3D object, a surface pattern on the 3D object, a bump map for the 3D object, a size of the 3D object, lighting for the 3D object, transparency of the 3D object, reflectiveness of the 3D object, and simulated degradation of the 3D object.

In a variation on this embodiment, the system receives input from a user to alter visual effects for the 3D object, and then alters visual effects for the 3D object in response to the input.

In a variation on this embodiment, visual effects for the 3D object change over time, thereby indicating aging of the associated computational resource.

In a variation on this embodiment, the visual effects are applied to a group of 3D objects whose associated computational resources have a similar usage context to the computational resource associated with the 3D object.

In a further variation, applying the visual effects to the group of 3D objects involves highlighting the group of 3D objects by using a scoped spotlight within the 3D display environment.

In a further variation, applying the visual effects to the group of 3D objects involves orienting the group of 3D objects such that the surfaces of the 3D objects have the same angle.

In a variation on this embodiment, applying the visual effects involves applying a view direction within the 3D display environment to make visible a subset of 3D objects in the 3D display environment which constitute a workspace.

In a variation on this embodiment, applying the visual effects involves changing a lighting position and corresponding shadows cast by the 3D object to indicate time of day.

In a variation on this embodiment, applying the visual effects involves changing a fog parameter within the 3D display environment to indicate morning fog.

In a variation on this embodiment, applying the visual effects involves changing a background color of the 3D display environment, wherein the background color is reflected by the 3D object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

3D Display Model

Figure 1:
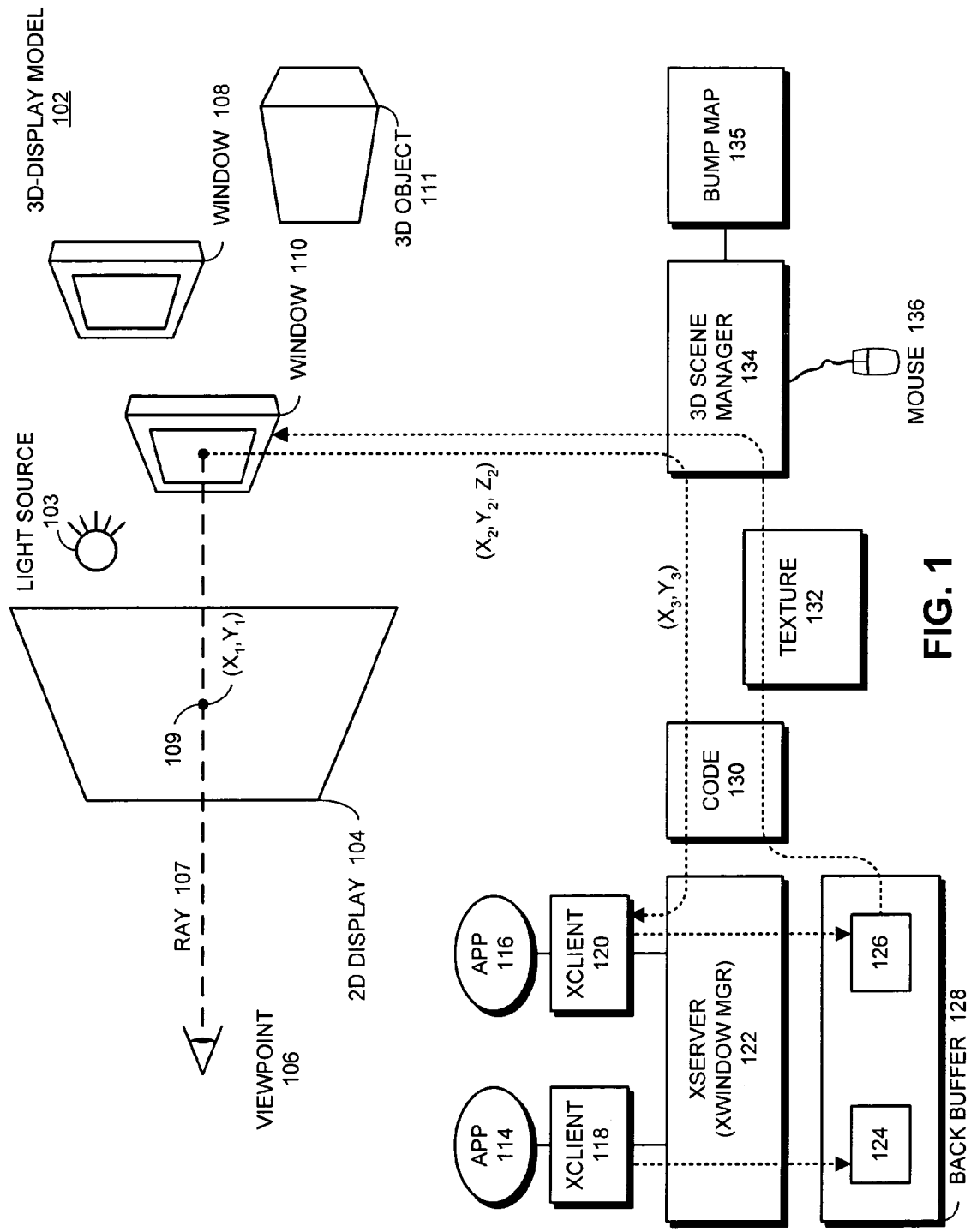
FIG. 1 illustrates a 3D display model with supporting components in accordance with an embodiment of the present invention.
Figure 2:
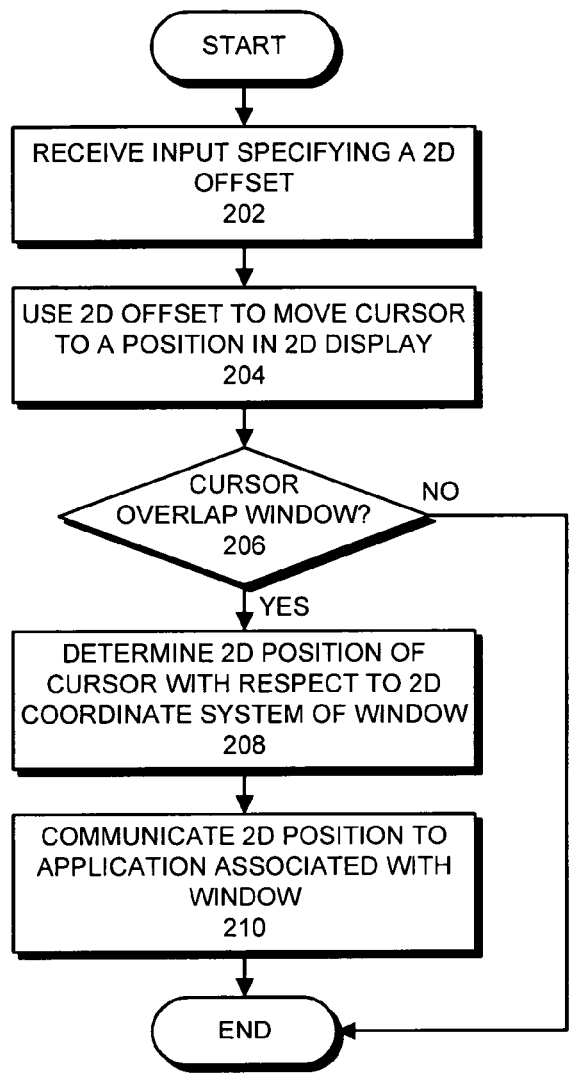
FIG. 2 presents a flow chart illustrating how input from a pointing device is communicated to an application associated with a window in a 3D display model in accordance with an embodiment of the present invention.

FIG. 1 illustrates 3D display model 102 with supporting components in accordance with an embodiment of the present invention. More specifically, the top portion of FIG. 1 illustrates 3D display model 102, which includes light source 103 and a number of 3D objects including window 108, window 110, and 3D object 111. Note that windows 108 and 110 are actually 3D objects which represent 2D windows. Hence, windows 108 and 110 can be moved and rotated within 3D display model 102, while they provide a 2D output and receive input for associated 2D applications. 3D display model 102 can additionally include a background (which is not shown).

Windows 108 and 110 can be associated with a number of window attributes. For example, window 110 can include x, y, and z position attributes that specify the 3D position of the center of window 110 within 3D display model 102, as well as a rotation attributes that specify rotations of window 110 around horizontal and vertical axes. Window 110 can also be associated with scaling factor, translucency and shape attributes.

3D objects within 3D display model 102 are viewed from a viewpoint 106 through a 2D display 104, which is represented by a 2D rectangle within 3D display model 102. During the rendering process, various well-known techniques, such as ray tracing, are used to map objects from 3D display model 102 into corresponding locations in 2D display 104.

The bottom portion of FIG. 1 illustrates some of the system components that make it possible to map 2D windows into 3D display model 102 in accordance with an embodiment of the present invention. Referring to FIG. 1, applications 114 and 116 are associated with windows 108 and 110, respectively. A number of components are involved in facilitating this association. In particular, applications 114 and 116 are associated with clients 118 and 120, respectively. Xclients 118 and 120 in turn interact with xserver 122, which includes an associated xwindow manager. These components work together to render output bitmaps 124 and 126 for applications 114 and 116 to be displayed in windows 108 and 110, respectively. These bitmaps 124 and 126 are maintained within back buffer 128.

Code module 130 causes bitmaps 124 and 126 to be displayed on corresponding windows 108 and 110. More specifically, code module 130 retrieves bitmap 126 and coverts it into a texture 132, which is displayed on the front face of window 110. This is accomplished though interactions with 3D scene manager 134. Bitmap 124 is similarly mapped into window 108.

3D scene manager 134 can also received input from a 2D pointing device, such as mouse 136, and can communicate this input to applications 114 and 116 in the following way. 3D scene manger 134 first receives an input specifying a 2D offset from mouse 136 (step 202). Next, the system uses this 2D offset to move a cursor 109 to a new position $(x_1,y_1)$ in 2D display 104 (step 204).

The system then determines if cursor 109 overlaps a window in 3D display model 102 (step 206). This can be accomplished by projecting a ray 107 from viewpoint 106 through cursor 109 and then determining if the ray intersects a window. If there is no overlap, the process is complete.

Otherwise, if there is overlap, the system uses the 3D position $(x_2,y_2,z_2)$ within display model 102 where ray 107 intersects window 110, as well as attributes of window 110, such as position and rotation attributes, to determine the 2D position $(x_3,y_3)$ of this intersection with respect to a 2D coordinate system of window 110 (step 208). The system then communicates this 2D position $(x_3,y_3)$ to application 116, which is associated with window 110 (step 210).

3D scene manger 134 is also coupled to bump map 135. Bump map 135 allows 3D scene manager 134 to apply a bump map with 3D texture effects to the surface of objects within 3D display model 102, such as 3D object 111.

Various user inputs, for example through mouse 136 or a keyboard, can be used to manipulate windows within 3D display model 102.

Using Visual Effects to Convey Usage Context

Figure 3:
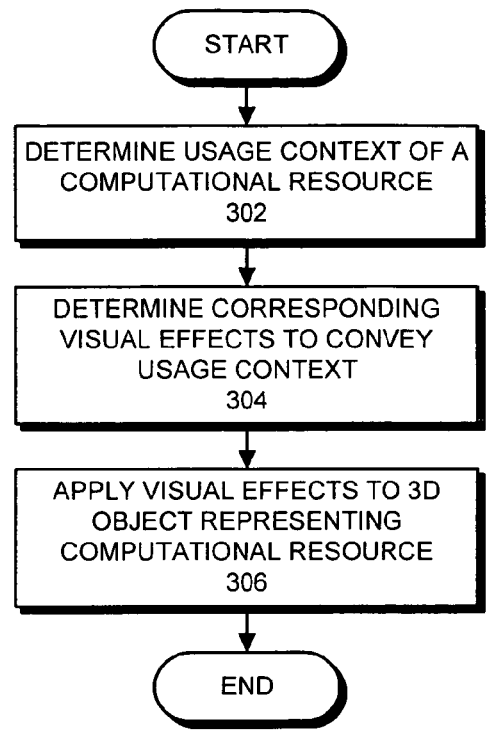
FIG. 3 presents a flow chart illustrating using visual effects to convey usage context of computational resources in accordance with an embodiment of the present invention.

FIG. 3 presents a flow chart illustrating the process of using visual effects to convey usage context of computational resources in accordance with an embodiment of the present invention. The system starts by determining the usage context of a computational resource (step 302). Note that the computational resource can include any type of entity within (or associated with) a centralized or distributed computer system. For example, a computational resource can include a file, a folder, or an application. Also note that the usage context of the computational resource can specify any attribute of a computational resource, such as a time at which the computational resource was created, a last time the computational resource was accessed, a frequency of usage of the computational resource, an owner of the computational resource, a location of the computational resource within the 3D display environment, and a group membership of the computational resource.

Next, the system determines a visual effects corresponding to the usage context to apply to the 3D object which represents the computational resource (step 304). Note that these visual effects can include any type of visual effect that can be created within a 3D display environment, such as a location of the 3D object, an orientation of the 3D object, a color of the 3D object, a texture of the 3D object, a surface pattern on the 3D object, a bump map for the 3D object, a size of the 3D object, lighting for the 3D object, transparency of the 3D object, reflectiveness of the 3D object, and simulated degradation of the 3D object. For example, simulated degradation of the object can indicate that a large amount of time has passed since the corresponding computational resource was last accessed. Furthermore, a specific bump map can be applied to the 3D object, along with color to indicate wear on an object that is accessed frequently. Finally, the system applies the visual effects to the 3D object within the 3D workspace (step 306).

Note that in addition to the visual effects that are generated based on usage context, the system may also apply visual effects based on actions taken by a user. For example, a user may make markings on the surface of objects or fold the corners of objects for specific purposes. These markings or folds may be incorporated along with the other visual effects being applied to the object. Furthermore, these markings or folds may themselves be subject to continuing visual effects such as aging.

Using Visual Effects to Indicate Groupings of Objects

Figure 4A:
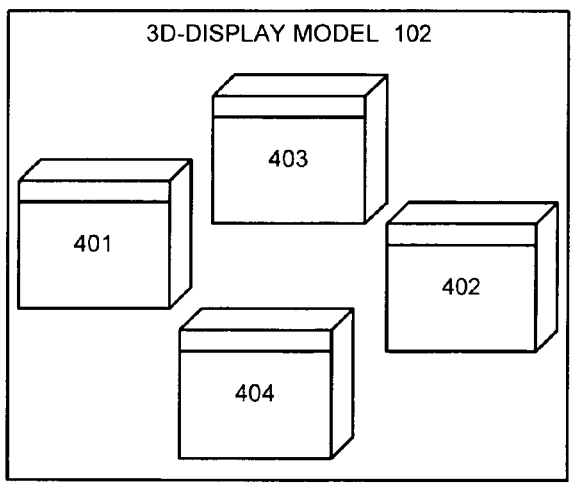
FIG. 4A illustrates a group of windows in accordance with an embodiment of the present invention.

FIG. 4A illustrates a group of windows in 3D display model 102 in accordance with an embodiment of the present invention. 3D display model 102 contains windows 401–404, which are arranged in a typical 2D application layout, which does not convey any usage context with regards to group membership.

Figure 4C:
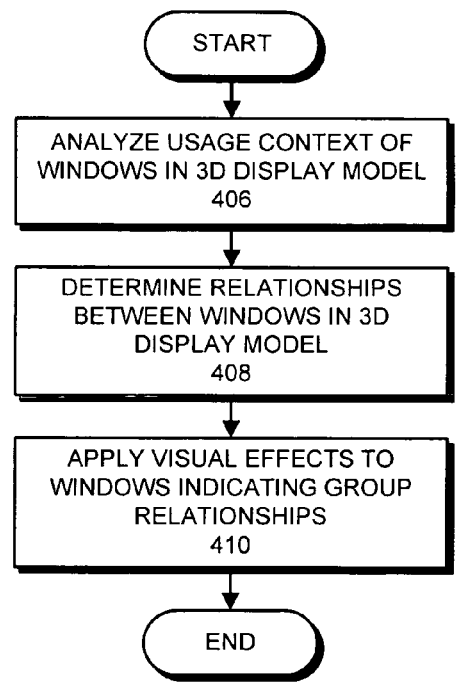
FIG. 4C presents a flow chart illustrating the process of using visual effects to convey usage context for a group of computational resources in accordance with an embodiment of the present invention.
Figure 4B:
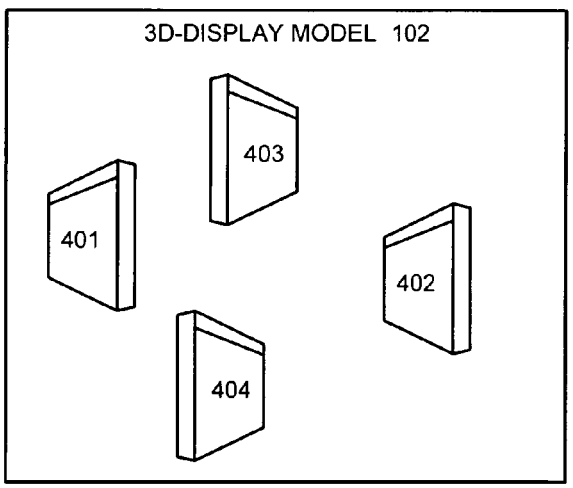
FIG. 4B illustrates a group of windows with visual effects indicating groups of windows in accordance with an embodiment of the present invention.

In contrast, FIG. 4B illustrates a group of windows in 3D display model 102 with visual effects indicating groupings of windows in accordance with an embodiment of the present invention. Windows 401 and 402 belong to the same application or resource, or are related in some manner, and are oriented to the same viewing angle. Likewise, windows 403 and 404 belong to the same application or resource, or are related in some manner, and are oriented to the same viewing angle. However, windows 401 and 402 are not related to windows 403 and 404, so the orientation of windows 403 and 404 is different than that of windows 401 and 402. Note that other visual effects mentioned previously may also be used to indicate group membership. For example, windows 403 and 404 may be highlighted with a scoped spotlight to indicate their group membership.

FIG. 4C presents a flow chart illustrating the process of using visual effects to convey usage context of a group of computational resources in accordance with an embodiment of the present invention. The system starts by analyzing the usage context of windows 401–404 (step 406). Next, the system determines relationships between the windows in 3D-display model 102 (step 408). Once the relationships have been determined, the system applies visual effects to windows 401 to 404 to indicate group membership (step 410). Note that as the visual effects for one window are altered, the visual effects for all related windows may be altered to maintain visual confirmation of the relationship. For instance, in one embodiment of the present invention, as a cursor moves over window 403, the orientation of window 403 may change so that it directly faces viewpoint 106. Because window 403 and window 404 are related, the orientation of window 404 may also change so that it directly faces viewpoint 106. Furthermore, when the cursor is moved off of window 403, windows 403 and 404 may both revert back to their original orientation.

Virtual Workspaces

Figure 5:
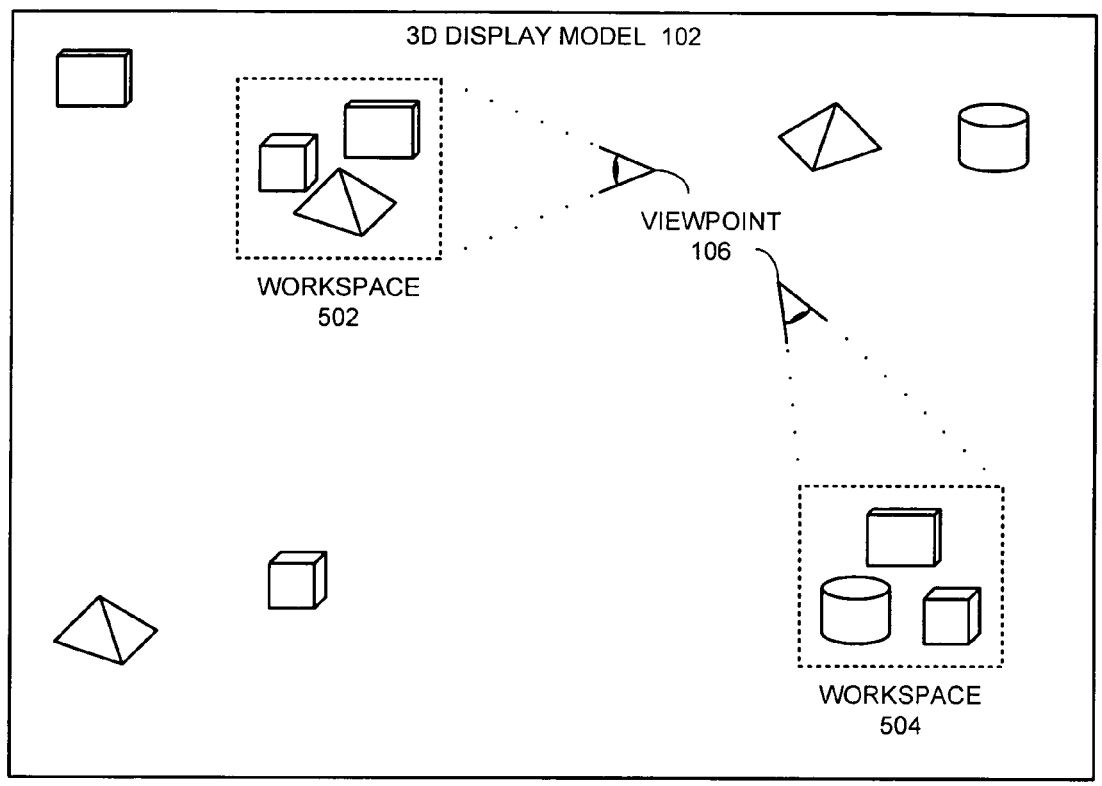
FIG. 5 illustrates a number of virtual workspaces in accordance with an embodiment of the present invention.

FIG. 5 illustrates a number of virtual workspaces within 3D display model 102 in accordance with an embodiment of the present invention. Note that 3D display model 102 contains many different 3D objects, many of which are not visible from viewpoint 106 at any given time. Objects that share some context and are related may be moved close together within 3D model 102 to create virtual workspaces. For example, in 3D display model 102, some objects are arranged to create workspace 502 and other objects are arranged to create workspace 504. Viewpoint 106 may be turned and/or moved through 3D display model to shift the focus from one workspace to another. Note that objects may also be part of multiple workspaces and may also move from workspace to workspace while viewpoint 106 is being moved.

Environment Mapping

Figure 6:
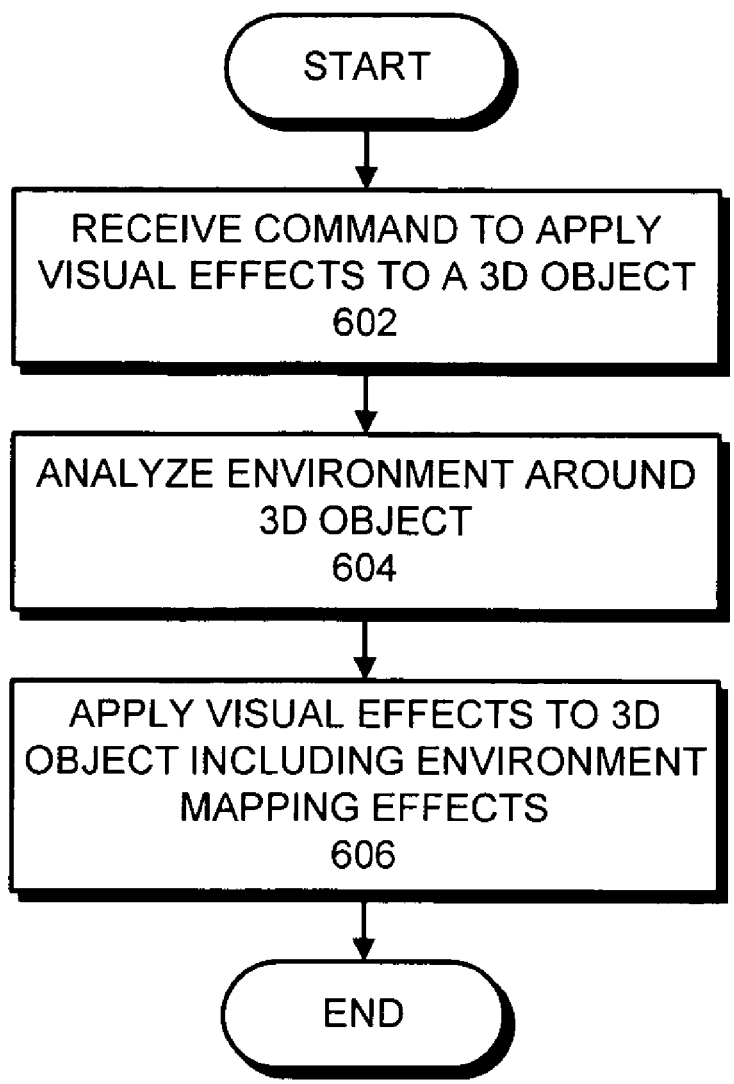
FIG. 6 presents a flow chart illustrating the process of environment mapping in accordance with an embodiment of the present invention.

FIG. 6 presents a flow chart illustrating environment mapping in accordance with an embodiment of the present invention. The system starts by receiving a command to apply visual effects to a 3D object (step 602). Note that any of the visual effects previously mentioned may be applied. In addition, the system analyzes the environment around the 3D object (step 604). For example, this can include checking for nearby objects, checking the time of day, and checking the background color. Once the surrounding environment has been analyzed, the system applies the visual effects to the 3D object along with visual effects that reflect the immediate environment around the 3D object (step 606). For example, if another object was close to the 3D object, the reflection of the other object might be visible on the surface of the 3D object. Environmental mapping allows the 3D display model to more closely model the real world including time of day, lighting, point of view, and location.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using visual effects within a three-dimensional (3D) display environment to indicate a usage context of a computational resource, wherein the computational resource is represented by a 3D object in the 3D display environment, the method comprising:
   determining the usage context of the computational resource;
   determining visual effects corresponding to the usage context to be applied to the 3D object which represents the computational resource; and
   applying the visual effects to the 3D object so that the usage context of the corresponding computational resource can be determined by viewing the 3D object within the 3D display environment, and wherein the visual effects for the 3D object change over time, thereby indicating aging of the associated computational resource.

2. The method of claim 1, wherein the computational resource can include one of:
   a file;
   a folder; and
   an application.

3. The method of claim 1, wherein the usage context of the computational resource can specify:
   a time at which the computational resource was created;
   a last time the computational resource was accessed;
   a frequency of usage of the computational resource;
   an owner of the computational resource;
   a location of the computational resource within the 3D display environment; and
   a group membership of the computational resource.

4. The method of claim 1, wherein the visual effects can include:
   a location of the 3D object;
   an orientation of the 3D object;
   a color of the 3D object;
   a texture of the 3D object;
   a surface pattern on the 3D object;
   a bump map for the 3D object;
   a size of the 3D object;
   lighting for the 3D object;
   transparency of the 3D object;
   reflectiveness of the 3D object; and
   simulated degradation of the 3D object.

5. The method of claim 1, further comprising: receiving input from a user to alter visual effects for the 3D object; and in response to the input, altering visual effects for the 3D object.

6. The method of claim 1, wherein the visual effects are applied to a group of 3D objects whose associated computational resources have a similar usage context to the computational resource associated with the 3D object.

7. The method of claim 6, wherein applying the visual effects to the group of 3D objects involves highlighting the group of 3D objects by using a scoped spotlight within the 3D display environment.

8. The method of claim 6, wherein applying the visual effects to the group of 3D objects involves orienting the group of 3D objects such that the surfaces of the 3D objects have the same angle.

9. The method of claim 1, wherein applying the visual effects involves applying a view direction within the 3D display environment to make visible a subset of 3D objects in the 3D display environment which constitute a workspace.

10. The method of claim 1, wherein applying the visual effects involves changing a lighting position and corresponding shadows cast by the 3D object to indicate time of day.

11. The method of claim 1, wherein applying the visual effects involves changing a fog parameter within the 3D display environment to indicate morning fog.

12. The method of claim 1, wherein applying the visual effects involves changing a background color of the 3D display environment, wherein the background color is reflected by the 3D object.

13. A computer-readable storage medium storing instructions that when executed by a computer cause the computer to perform a method for using visual effects within a three-dimensional (3D) display environment to indicate a usage context of a computational resource, wherein the computational resource is represented by a 3D object in the 3D display environment, the method comprising:
   determining the usage context of the computational resource;
   determining visual effects corresponding to the usage context to be applied to the 3D object which represents the computational resource; and
   applying the visual effects to the 3D object so that the usage context of the corresponding computational resource can be determined by viewing the 3D object within the 3D display environment, and wherein the visual effects for the 3D object change over time, thereby indicating aging of the associated computational resource.

14. The computer-readable storage medium of claim 13, wherein the computational resource can include one of:
   a file;
   a folder; and
   an application.

15. The computer-readable storage medium of claim 13, wherein the usage context of the computational resource can specify:
   a time at which the computational resource was created;
   a last time the computational resource was accessed;
   a frequency of usage of the computational resource;
   an owner of the computational resource;
   a location of the computational resource within the 3D display environment; and
   a group membership of the computational resource.

16. The computer-readable storage medium of claim 13, wherein the visual effects can include:
   a location of the 3D object;
   an orientation of the 3D object;
   a color of the 3D object;
   a texture of the 3D object;
   a surface pattern on the 3D object;
   a bump map for the 3D object;
   a size of the 3D object;
   lighting for the 3D object;
   transparency of the 3D object;
   reflectiveness of the 3D object; and
   simulated degradation of the 3D object.

17. The computer-readable storage medium of claim 13, wherein the method further comprises:
   receiving input from a user to alter visual effects for the 3D object; and
   in response to the input, altering visual effects for the 3D object.

18. The computer-readable storage medium of claim 13, wherein the visual effects are applied to a group of 3D objects whose associated computational resources have a similar usage context to the computational resource associated with the 3D object.

19. The computer-readable storage medium of claim 18, wherein applying the visual effects to the group of 3D objects involves highlighting the group of 3D objects by using a scoped spotlight within the 3D display environment.

20. The computer-readable storage medium of claim 18, wherein applying the visual effects to the group of 3D objects involves orienting the group of 3D objects such that the surfaces of the 3D objects have the same angle.

21. The computer-readable storage medium of claim 13, wherein applying the visual effects involves applying a view direction within the 3D display environment to make visible a subset of 3D objects in the 3D display environment which constitute a workspace.

22. The computer-readable storage medium of claim 13, wherein applying the visual effects involves changing a lighting position and corresponding shadows cast by the 3D object to indicate time of day.

23. The computer-readable storage medium of claim 13, wherein applying the visual effects involves changing a fog parameter within the 3D display environment to indicate morning fog.

24. The computer-readable storage medium of claim 13, wherein applying the visual effects involves changing a background color of the 3D display environment, wherein the background color is reflected by the 3D object.

25. An apparatus for using visual effects within a three-dimensional (3D) display environment to indicate a usage context of a computational resource, wherein the computational resource is represented by a 3D object in the 3D display environment, the method comprising:
   a usage mechanism configured to determine the usage context of the computational resource;
   a determination mechanism configured to determine visual effects corresponding to the usage context to be applied to the 3D object which represents the computational resource; and
   a visual effects mechanism configured to apply the visual effects to the 3D object so that the usage context of the corresponding computational resource can be determined by viewing the 3D object within the 3D display environment, and wherein the visual effects for the 3D object change over time, thereby indicating aging of the associated computational resource.

26. The apparatus of claim 25, wherein the computational resource can include one of:
   a file;
   a folder; and
   an application.

27. The apparatus of claim 25, wherein the usage context of the computational resource can specify:
   a time at which the computational resource was created;
   a last time the computational resource was accessed;
   a frequency of usage of the computational resource;
   an owner of the computational resource;
   a location of the computational resource within the 3D display environment; and
   a group membership of the computational resource.

28. The apparatus of claim 25, wherein the visual effects can include:
   a location of the 3D object;
   an orientation of the 3D object;
   a color of the 3D object;
   a texture of the 3D object;
   a surface pattern on the 3D object;
   a bump map for the 3D object;
   a size of the 3D object;
   lighting for the 3D object;
   transparency of the 3D object;
   reflectiveness of the 3D object; and
   simulated degradation of the 3D object.

29. The apparatus of claim 25, further comprising a receiving mechanism configured to receive input from a user to alter visual effects for the 3D object, wherein the visual effects mechanism is further configured to alter visual effects for the 3D object in response to the input.

30. The apparatus of claim 25, wherein the visual effects mechanism is further configured to apply the visual effects to a group of 3D objects whose associated computational resources have a similar usage context to the computational resource associated with the 3D object.

31. The apparatus of claim 30, wherein the visual effects mechanism is further configured to highlight the group of 3D objects by using a scoped spotlight within the 3D display environment.

32. The apparatus of claim 30, wherein the visual effects mechanism is further configured to orient the group of 3D objects such that the surfaces of the 3D objects have the same angle.

33. The apparatus of claim 25, wherein the visual effects mechanism is further configured to apply a view direction within the 3D display environment to make visible a subset of 3D objects in the 3D display environment which constitute a workspace.

34. The apparatus of claim 25, wherein the visual effects mechanism is further configured to change a lighting position and corresponding shadows cast by the 3D object to indicate time of day.

35. The apparatus of claim 25, wherein the visual effects mechanism is further configured to change a fog parameter within the 3D display environment to indicate morning fog.

36. The apparatus of claim 25, wherein the visual effects mechanism is further configured to change a background color of the 3D display environment, wherein the background color is reflected by the 3D object.

* * * * *